United States Patent [19]

Dearman

[11] Patent Number: 5,290,013
[45] Date of Patent: Mar. 1, 1994

[54] SPADING FORK

[76] Inventor: Timothy C. Dearman, 13015 Stone Rd., Pearland, Tex. 77581

[21] Appl. No.: 14,316

[22] Filed: Feb. 5, 1993

[51] Int. Cl.5 .............................................. B66F 3/00
[52] U.S. Cl. ................................................... 254/132
[58] Field of Search ............ 254/129, 130, 131, 131.5, 254/132; 294/50, 50.5, 50.6, 53.5

[56] References Cited

U.S. PATENT DOCUMENTS

| 41,287 | 1/1864 | Flanagan. | |
| 45,216 | 11/1864 | Ball. | |
| 57,614 | 8/1866 | Winegar. | |
| 568,119 | 9/1896 | Rowland. | |
| 801,557 | 10/1905 | Stritter. | |
| 930,784 | 8/1909 | Nelson | 254/131.5 |
| 1,261,859 | 4/1918 | Seiter | 294/53.5 |
| 1,741,004 | 12/1929 | Wornstaff | 294/53.5 |
| 1,810,026 | 6/1931 | Moller | 294/53.5 |
| 1,911,287 | 5/1933 | Pladson. | |
| 2,725,946 | 12/1955 | Welter | 254/129 |
| 2,910,271 | 10/1959 | Keehn | 254/129 |
| 3,473,838 | 10/1969 | Rankin | 294/53.5 |
| 4,243,206 | 1/1981 | Heikkinen et al. | 254/132 |

FOREIGN PATENT DOCUMENTS 19206 10/1900 United Kingdom ................ 254/129

Primary Examiner—Robert C. Watson
Attorney, Agent, or Firm—Learman & McCulloch

[57] ABSTRACT

A spading tool for use by persons who are unable or prefer not to bend over when uprooting weeds and other material has an elongate handle at the lower end of which is hinged a multiple-tine fork adapted to be embedded in the ground adjacent a weed to be uprooted. A ratcheting latch device enables the fork to be moved from an initial position in prolongation of the handle to an adjusted, angular position by rocking the handle back and forth. Such movement of the fork effects lifting of the weed out of the ground for disposal. The latch device may be disabled by movement of a remote release lever whereupon a return spring forcibly returns the fork to the initial position ready for further use.

12 Claims, 3 Drawing Sheets

U.S. Patent    Mar. 1, 1994    Sheet 1 of 3    5,290,013
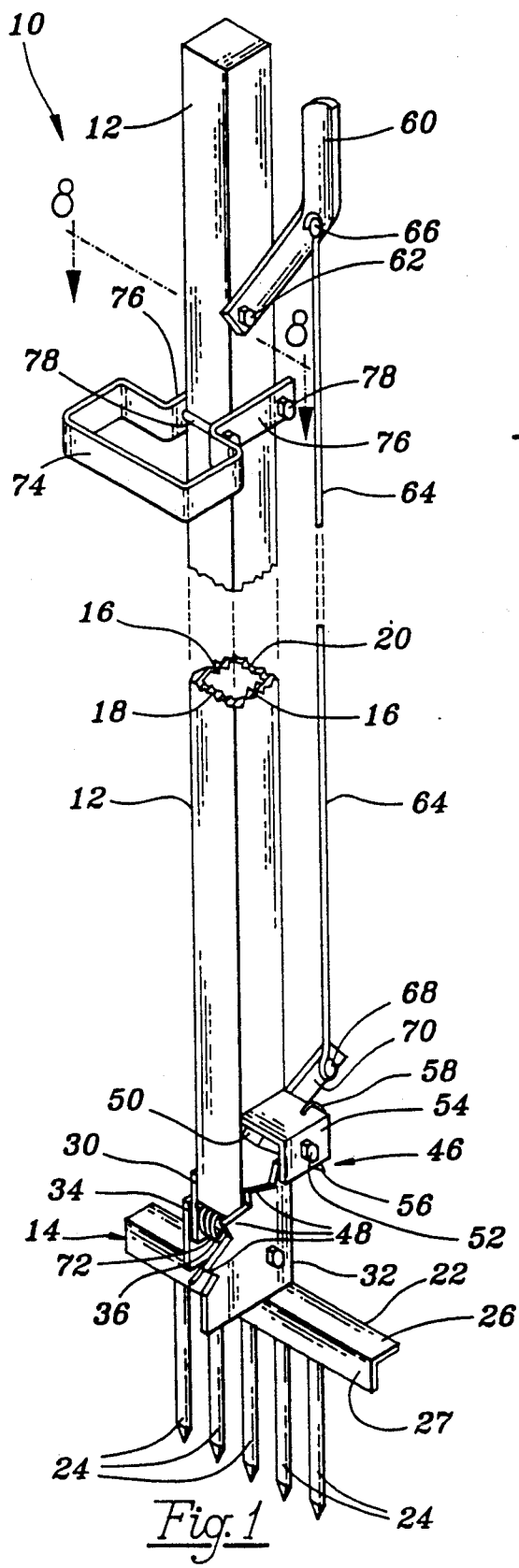
Fig. 1
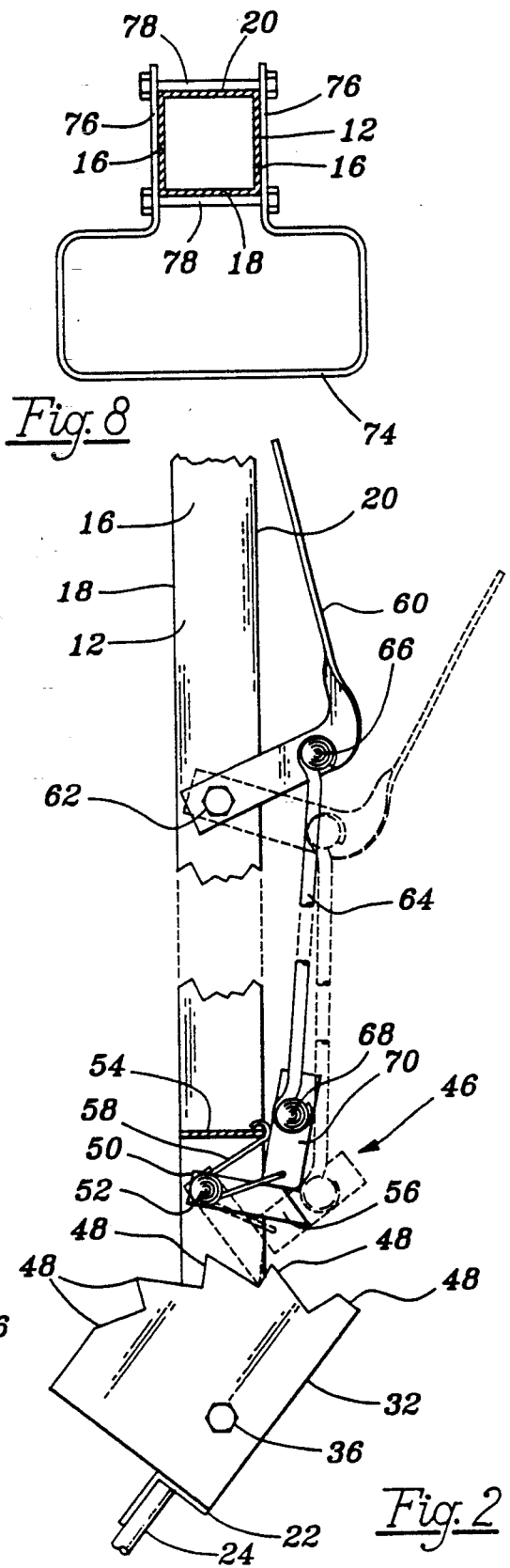
Fig. 8
Fig. 2

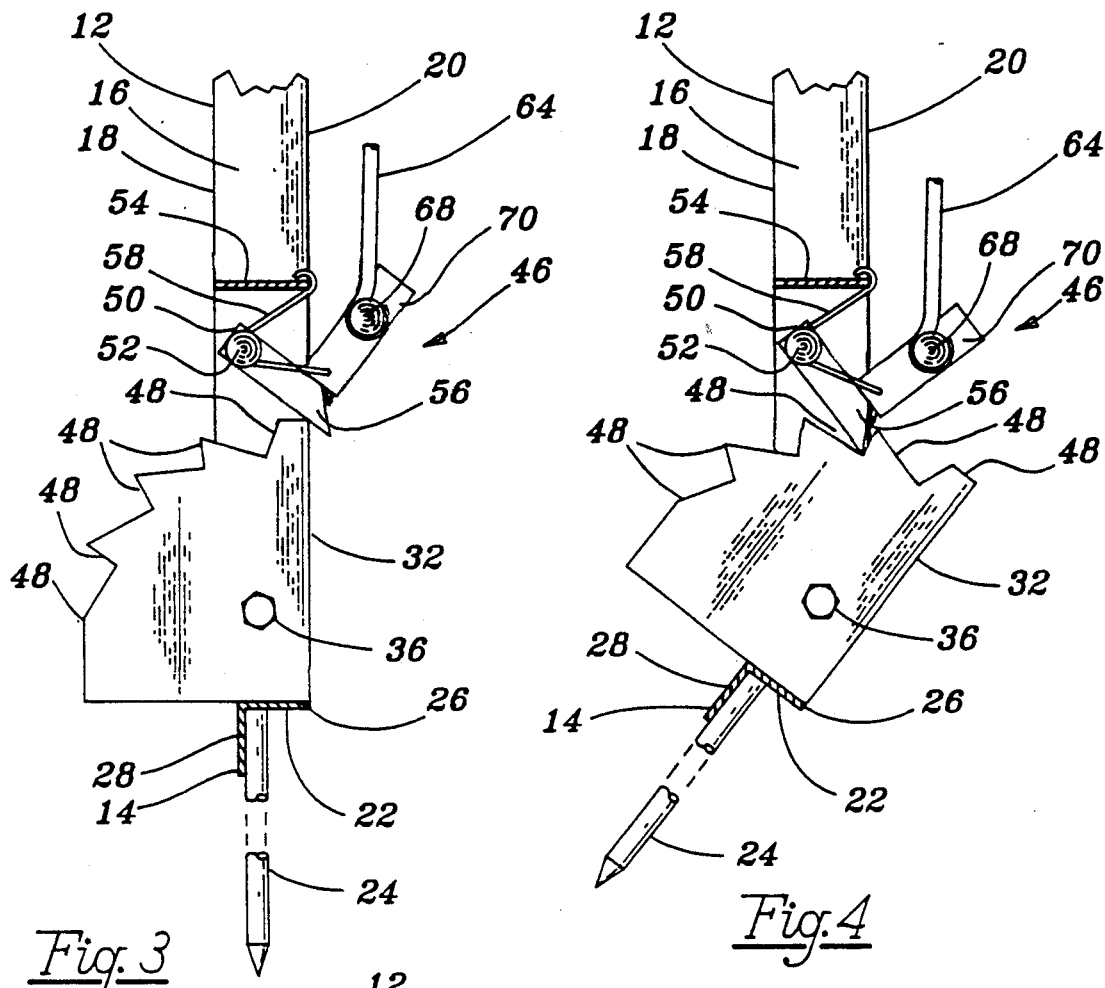
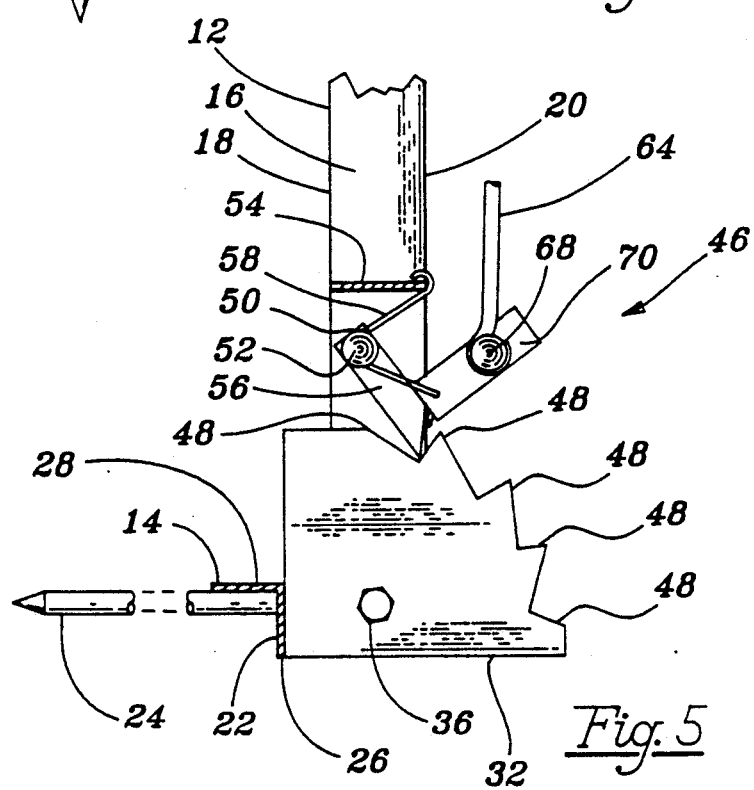

SPADING FORK

This invention relates to a spading fork adapted for use by persons in manually working soil and uprooting weeds, potatoes, carrots, or other plants while standing in an upright position.

BACKGROUND OF THE INVENTION

Spading forks have a variety of uses, including uprooting weeds, potatoes, carrots, and other plants, as well as working soil. A conventional spading fork has a long handle to the lower end of which is secured a fork having multiple tines extending in prolongation of the handle. To uproot weeds, for example, the user pushes the tines of the fork into the earth next to a weed with his foot and then, using the handle as a lever, pulls back on the handle forcing the tines upwardly beneath the weed until the weed is free of the ground. Typically, the tines of the fork and hence the handle must be moved to a nearly horizontal position close to the ground before complete uprooting occurs, requiring the user to bend at the waist. Some persons, however, are unable or prefer not to bend over when performing such task.

SUMMARY OF THE INVENTION

A manually operated tool for uprooting plants and working soil comprises a spade member hinged to an elongate main handle to enable the spade to pivot relative to the handle from an initial position of adjustment in which the spade extends generally vertically in prolongation of the handle and any selected one of a plurality of angularly adjusted positions. Ratchet means is provided for adjusting the spade member from its initial position to a substantially horizontal position in response to back and forth rocking movements of the handle while the spade is in the ground. The tool further includes release means for disabling the ratchet means and spring biased return means for continuously urging the spade member toward the initial position of adjustment upon disablement of the ratchet mechanism.

The ratcheting feature of the spading tool enables the user to uproot plants and work soil without bending over. All that is required is for the user to imbed the spade in the ground and then work the extension arm back and forth to cause the spade to ratchet toward a horizontal position and be forced under the soil or material to be raised.

The release means enables the user to disable the ratchet means, whereupon the spring biased return means automatically returns the spade to the initial position without further effort by the user.

THE DRAWINGS

A preferred embodiment of the invention is illustrated in the accompanying drawings, wherein:

FIG. 1 is a fragmentary perspective view of the spading tool;

FIG. 2 is a fragmentary side elevation view illustrating the operation of the latching mechanism;

FIGS. 3-5 are fragmentary side elevation views illustrating the spading fork in three different positions;

FIG. 8 is a transverse sectional view taken along the line 8—8 of FIG. 1.

DETAILED DESCRIPTION

Figure 6:
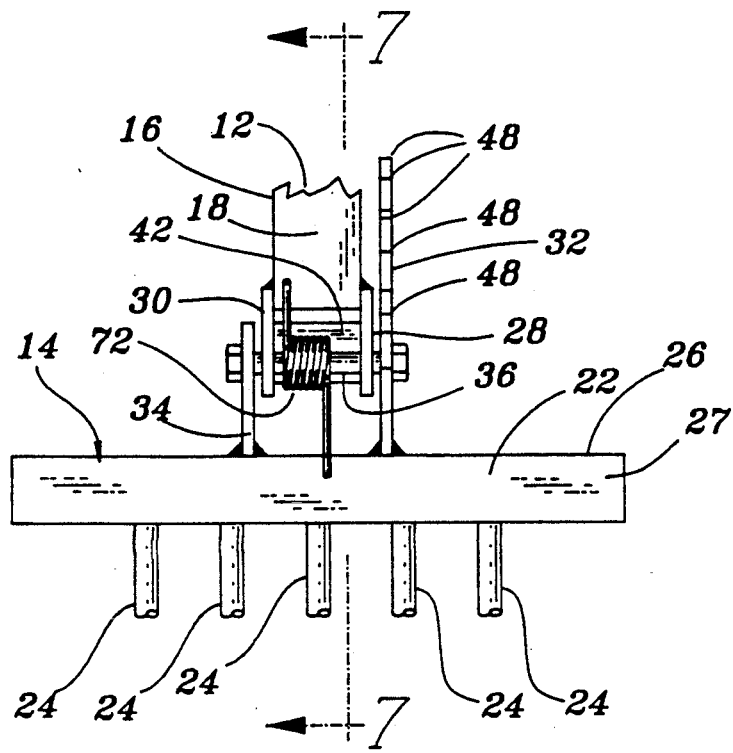
FIG. 6 is a fragmentary front elevation view illustrating details of the return spring feature.

A spading fork tool constructed according to a presently preferred embodiment of the invention is indicated generally at 10 in FIG. 1 and is adapted for uprooting plants, weeds, and lifting other material out of the ground as well as for working and turning the soil.

The tool 10 comprises an elongate handle 12 having its lower end hinged to a spade member. As disclosed, the spade is in the form of a multiple-tine fork 14. The handle 12 is preferably fabricated from metal square tube stock and as such includes a pair of opposing side walls 16 and a pair of opposing front 18 and back 20 walls interconnecting the side walls 16. The upper end of the handle 12 is adapted to be grasped by a hand of the user while standing in an upright position.

The fork 14 has a horizontal crossbar 22 that extends generally normal to the length of the handle 12 and mounts a plurality of tines 24. The crossbar 22 is generally L-shaped in section and includes a flat top wall portion 26 and a depending front wall portion 27. The tines 24 are preferably metal rod-like members that are secured at corresponding ends to the underside of the top 26 and front wall 27 portions by welding or other suitable means and extend therefrom normal to the top wall portion 26 to distal free ends. There are five tines illustrated in the preferred embodiment and they are shown as being equally spaced from one another. It will be appreciated, however, that the number and spacing may differ depending on the size of the particular tool and the specific application for which it is to be used.

Figure 7:
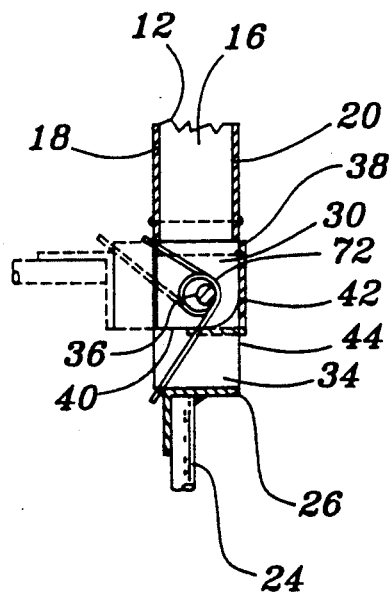
FIG. 7 is a fragmentary sectional view taken along the line 7—7 of FIG. 6.

The hinged connection between the fork 14 and handle 12 is provided by hinge means comprising an upper pair of spaced apart and parallel hinge plates 28, 30 that are welded or otherwise fixed to the opposing side walls 16 of the handle 12 and project downwardly beyond the lower end thereof toward the fork 14, and a corresponding pair of lower hinge plates 32, 34 that similarly are welded or otherwise fixed to the top wall 26 of the crossbar member 22 and extend upwardly therefrom and straddle the upper hinge plates 28, 30. The upper and lower hinge plate pairs have aligned apertures through which extends a hinge pin 36 that interconnects the hinge plates and enables the fork 14 to swing or pivot relative to the handle 12 about the pivot axis of the pin 36. The upper hinge plates 28, 30 have a rear edge 38 extending lengthwise of the handle 12 and a bottom edge 40 extending normal to the rear edge 38. A stop plate 42 extends crosswise between and is secured to a back edge 44 of the lower hinge plates 32, 34 behind the upper hinge plates 28, 30 and is movable with the upper hinge plates 28, 30. As shown in FIG. 7, the stop plate 42 limits the travel of the fork 14 by engaging the rear edge 38 of the upper hinge plates 28, 30 when the fork 14 occupies the position shown in solid lines in which the tines 24 extend in prolongation of the handle 12. The stop plate 42 engages the bottom edge 40 of the hinge plate when the fork 14 is rocked to the position shown in broken lines in which the tines 24 project forwardly of the handle 12 and are more or less horizontal.

Ratchet means 46 are provided for enabling the fork 14 to pivot freely from its initial position toward an adjusted position while releasably locking the fork 14 in such adjusted position. One of the lower hinge plates 32 also functions as a ratchet plate and is provided with a series of directional ratchet teeth 48 that are arranged along an arc having the axis of the hinge pin 36 as its center. A pawl member 50 is mounted on the handle 12 above the ratchet plate 32 by a pivot pin 52. An L-shaped, rigid support arm 54 projects from one side of the handle 12 and supports the extended end of the pivot pin 52 for added support. The pawl 50 has a locking tooth 56 extending downwardly and rearwardly toward the ratchet plate 32.

A biasing torsion spring 58 is carried by the pivot pin 52 and has arms which react between the pawl 50 and the support arm 54 to bias the locking tooth 56 constantly toward engagement with the ratchet teeth 48. The directional nature of the ratchet teeth 48 allows the locking tooth 56 to skip successively over the ratchet teeth 48 as the fork 14 is pivoted from its initial position to the adjusted position.

The locking tooth 56 successively engages the ratchet teeth 48 to lock the fork 14 against reverse pivotal movement. FIGS. 2-5 show the fork 14 in different positions of angular adjustment with respect to the handle 12. FIG. 3 illustrates the initial position, FIG. 5 illustrates the maximum position of adjustment, and FIGS. 2 and 4 illustrate intermediate positions of adjustment.

Release means are provided for selectively disabling the latch means by lifting the locking tooth 56 of the pawl 50 out of engagement with the ratchet teeth 48 to enable the fork 14 to return to its initial position. The release means includes a release lever 60 that is connected to the handle 12 by a pivot pin 62 adjacent the upper end of the handle 12 remote from the pawl 50. A connecting member 64 is attached pivotally at the upper end thereof to the release lever 60 at a position spaced from the pivot pin 62. The member 64 also is pivoted at its lower end to the pawl 50 for transmitting pivotal movement of the release lever 60 to the pawl 50 to lift the pawl 50 out of engagement with the teeth 48 of the ratchet plate 32 against the force of the spring 58. As is illustrated best in FIG. 2, the broken line position of the pawl and lever represent the locked condition of the ratchet mechanism and the solid line position represents the disabled condition. As also is shown in FIG. 2, each end of the connecting rod 64 is provided with a loop or eye formed by bending the ends of the rod 64 back upon itself. A connecting pin 66 extends through the eye at the upper end of the rod 64 and is secured to the release lever 60 at a location spaced from the associated pivot pin 62, so that rotational movements of the lever 60 are transmitted as translational movements by the connecting rod 64. Another connecting pin 68 extends through the eye at the lower end of the rod 64 and is secured to an upwardly projecting leg 70 of the pawl 50 attached to the locking tooth 56 at a location spaced from the associated pivot pin 52, so that the upward translational movement of the connecting rod 64 is transmitted into upward rotational lifting movement of the pawl 50.

Spring biased return means are provided for continuously urging the fork 14 toward its initial position so as automatically to return the fork to such position upon unlocking of the ratchet mechanism 46. As shown in FIGS. 1, 6, and 7, the return means preferably comprises a torsion spring 72 accommodated between the upper hinge plates 28, 30 and having a central coiled portion supported on the hinge pin 36 and a pair of spring arm portions reacting between the lower end of the handle 12 at a level above that of the pivot axis and the crossbar portion 22 of the fork 14 at a level below that of the pivot axis so that when the pawl 50 is lifted out of engagement with the ratchet teeth 48, the return spring 72 forces the fork 14 to rock to its initial position.

An auxiliary handle 74 is secured to the main handle 12 just below the release lever 60 and projects transversely outwardly for grasping by the other hand of the user for added support and control. As is shown best in FIG. 8, the auxiliary handle 74 has a generally open rectangular configuration and includes a pair of mounting legs 76 that straddle opposing side walls 16 of the main handle 12. The legs 76 have a pair of apertures aligned on either side of the main handle 12 and through which a corresponding pair of fasteners 78 extend for clamping the legs 76 tightly against the main handle 12 to secure the auxiliary handle 74 to the main handle 12.

In use, the fork 14 initially occupies a position in which the tines extend in prolongation of the handle as is shown in FIGS. 1 and 3. The user grasps the upper end of the main handle 12 with one hand and the auxiliary handle 74 with the other. With the handle 12 generally upright, the user may place his foot on the crossbar 22 to embed the tines in the ground adjacent the plant or other material that is to be uprooted or lifted. Then, while standing in an upright position, the user may rock the handle 12 forwardly so as to relocate the locking tooth 56 of the pawl 50 in the space between two adjacent ratchet teeth 48. The handle 12 then may be rocked rearwardly causing the tines 24 of the fork 14 to tilt upwardly beneath the plant or material. This procedure may be repeated several times until the fork 14 occupies a more or less horizontal position (see FIG. 5) thereby effectuating uprooting or lifting of the plant to the surface of the ground for disposal. At no time, however, is it necessary for the handle 12 to occupy a position close to the ground, thereby obviating the need for the user to bend over.

After the plant or material has been lifted, the user, while remaining in an upright standing position, may squeeze the release lever 60 toward the handle 14 causing the pawl 50 to be lifted out of engagement with the ratchet plate 32, whereupon the return spring automatically returns the fork 14 to the initial position ready for further use.

The disclosed embodiment is representative of a presently preferred embodiment of the invention, but is intended to be illustrative rather than definitive thereof. The invention is defined in the claims.

I claim:

1. A manual tool for uprooting plants from the ground and working soil, comprising:
   a spade member adapted to be imbedded in the ground;
   an elongate main handle having a longitudinal axis;
   hinge means interconnecting said spade member and said handle for enabling said spade member to pivot about an axis relative to said handle from an initial position in which the spade member extends in prolongation of said handle generally along said longitudinal axis to a selected one of a plurality of adjusted positions relative to said handle;
   ratchet means for advancing said spade member from said initial position to a selected one of said adjusted positions in response to back and forth rocking movements of said handle;
   latch means for releasably locking said spade member in said selected position of adjustment;
   release means for disabling said latch means; and
   return mans constantly biasing said spade member toward said initial position for automatically returning said spade member to said initial position in response to disabling said latch means; said ratchet means including a ratchet plate having a plurality of directional ratchet teeth arranged along an arc having said pivot axis of said hinge means as its center, said latch means including a pawl engageable with successive ones of said ratchet teeth for enabling pivotal movement of said spade member in one direction and locking said spade member against reverse pivotal movement; and a spring acting on said pawl for continuously and forcibly urging said pawl toward engagement with said ratchet teeth, said latch means including a pivot pin defining a pivot axis and wherein said spring comprises a torsion spring supported on said pivot pin and reacting between said pawl and said extension arm for continuously urging said pawl toward rotation about said pivot axis into engagement with said ratchet teeth.

2. A manual tool for uprooting plants from the ground and working soil, comprising:

a spade member adapted to be imbedded in the ground;

an elongate main handle having a longitudinal axis;

hinge means including a hinge pin defining a pivot axis and interconnecting said spade member and said handle for enabling said spade member to pivot about said pivot axis relative to said handle from an initial position in which the spade member extends in prolongation of said handle generally along said longitudinal axis to a selected one of a plurality of angularly adjusted positions relative to said handle;

ratchet means for advancing said spade member from said initial position to a selected one of said adjusted positions in response to back and forth pivotal movements of said handle;

latch means for releasably locking said spade member in said selected position of adjustment;

release means for disabling said latch means; and return means comprising a torsion spring encircling said hinge pin and reacting with constant biasing force between said main handle at a level above that of said hinge axis and said spade member at a level below that of said hinge axis so as constantly to bias said spade member toward said initial position for automatically returning said spade member to said initial position in response to disabling said latch means.

3. The tool according to claim 2 wherein said ratchet means includes a ratchet plate having a plurality of directional ratchet teeth.

4. The tool according to claim 3 wherein said ratchet teeth are arranged along an arc having said pivot axis of said hinge means as its center.

5. The tool according to claim 4 wherein said latch means includes a pawl engageable with successive ones of said ratchet teeth for enabling pivotal movement of said spade member in one direction and locking said spade member against reverse pivotal movement.

6. The tool according to claim 5 including a spring acting on said pawl for continuously and forcibly urging said pawl toward engagement with said ratchet teeth.

7. The tool according to claim 6 wherein said latch means includes a pivot pin forming a pivot axis and said spring comprises a torsion spring supported on said pivot pin and reacting between said pawl and said extension arm for continuously urging said pawl toward rotation about said pivot axis into engagement with said ratchet teeth.

8. The tool according to claim 6 wherein said release means comprises a movable remote actuator connected to said pawl by a motion transmitting link, whereby bodily movement of said link effects corresponding movement of said pawl out of engagement with said ratchet teeth.

9. The tool according to claim 8 wherein said actuator comprises a lever pivoted on said handle and said link comprises a rigid rod pivotally coupled to each of said lever and said pawl.

10. The tool according to claim 2 wherein said ratchet means is secured to said spade member for movement therewith and said pawl is secured to said handle.

11. The tool according to claim 2 wherein said spade member comprises a fork having a horizontal crossbar and a plurality of spaced apart tines extending from said crossbar.

12. The tool according to claim 2 including an auxiliary handle secured to said main handle and extending transversely thereof for grasping by a user of said tool.

* * * * *